(No Model.)
W. H. DODGE.
DEVICE FOR TRANSMITTING POWER.
No. 359,596. Patented Mar. 22, 1887.
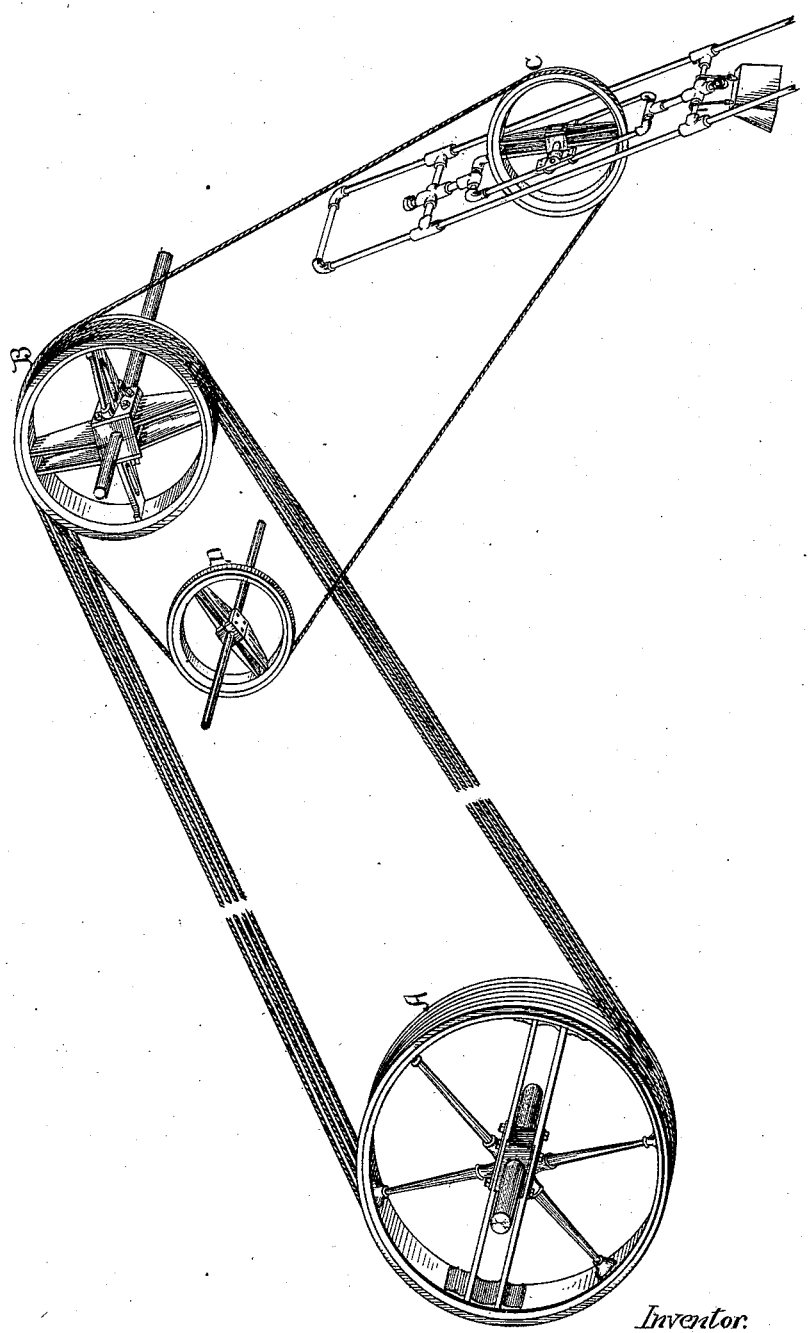
Witnessess:
J. B. McGinn
M. Towle.
Inventor.
Wallace H. Dodge
by his atty
R. D. O. Smith

UNITED STATES PATENT OFFICE.

WALLACE H. DODGE, OF MISHAWAKA, INDIANA.

DEVICE FOR TRANSMITTING POWER.

SPECIFICATION forming part of Letters Patent No. 359,596, dated March 22, 1887.

Application filed July 1, 1886. Serial No. 206,794. (No model.)

*To all whom it may concern:*

Be it known that I, WALLACE H. DODGE, of Mishawaka, in the county of St. Joseph and State of Indiana, have invented new and useful Improvements in Transmitting Power by Rope; and I do hereby declare that the following is a full and accurate description of the same.

This invention relates to the device for transmitting power for which Letters Patent were granted to me June 23, 1885, No. 320,544, and it relates to an improvement in the manner of winding the pulleys for certain purposes.

The figure represents in perspective my invention.

A is the main driving-pulley, and B the main driven pulley. Supposing the driven pulley B is at some distance from the driving-pulley A—say a hundred feet or more—the length of rope E required would be twice the distance between the pulleys, and the weight of the rope so suspended would cause a material strain on the journal-bearings. It is necessary to pass the transmitting-rope around both pulleys for draft, and then once for lead to the slack-take-up C, because said pulley C must take up slack and lead the rope back again to the first groove in the main pulley, and therefore this last turn cannot perform labor in the transmission.

The object of my present invention is to avoid the necessity of the last-named turn over the driven pulley before the rope passes to the slack-take-up pulley; and it consists in the use of a snub-pulley, D, close to the driving-pulley A or driven pulley B, over which to pass the slack part of the transmitting-rope, and thence to the slack-take-up C.

It is immaterial whether the snub-pulley is placed near to the driving-pulley or close to the driven pulley; but the slack-take-up C must be near the same pulley. The transmission-rope may pass around the driving and driven pulleys as often as may be necessary to secure the required traction strength; but by my improvement, supposing the slack-take-up to be near the driven pulley, the last turn, which is a slack turn, passes the snub-pulley instead of going again to the driven pulley. By this means the journal-bearings are relieved from the strain due to the length of rope necessary to pass once over the driven pulley.

Having described my invention, I claim as new—

The transmitting-rope E, the pulleys A B, and the slack-take-up pulley C, combined with a snub-pulley, D, placed between the said pulleys A B, to take the slack and return it to the pulley C, as and for the purpose set forth.

WALLACE H. DODGE.

Witnesses:
WILL W. DODGE,
R. D. O. SMITH.